(12) United States Patent
Wilson et al.

(10) Patent No.: US 12,487,729 B2
(45) Date of Patent: Dec. 2, 2025

(54) SYSTEM FOR GENERATING A GRAPHICAL USER INTERFACE ON A MOBILE DEVICE FOR AN ISSUE TRACKING SYSTEM EVENT FEED

(71) Applicants: Atlassian Pty Ltd., Sydney (AU); Atlassian US, Inc., San Francisco, CA (US)

(72) Inventors: David Wilson, Sydney (AU); Yann Bodson, Sydney (AU); Robert Chatfield, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 18/227,864

(22) Filed: Jul. 28, 2023

(65) Prior Publication Data
US 2024/0004518 A1    Jan. 4, 2024

Related U.S. Application Data

(63) Continuation of application No. 17/853,825, filed on Jun. 29, 2022, now Pat. No. 11,726,636.

(51) Int. Cl.
 *G06F 3/0482* (2013.01)
 *G06F 21/31* (2013.01)
(52) U.S. Cl.
 CPC ............ *G06F 3/0482* (2013.01); *G06F 21/31* (2013.01)

(58) Field of Classification Search
CPC ................... G06F 3/0482; G06F 21/31; G06F 2203/04803; G06F 3/04817; G06F 3/0483
See application file for complete search history.

(56) References Cited

U.S. PATENT DOCUMENTS

| | | | |
|---|---|---|---|
| 10,942,978 B1 | 3/2021 | Paul et al. | |
| 11,025,582 B1 | 6/2021 | Paul et al. | |
| 11,102,403 B2 | 8/2021 | Kawasaki | |
| 11,144,854 B1 * | 10/2021 | Mouawad | G06Q 10/0639 |
| 11,150,782 B1 * | 10/2021 | Underwood | G06Q 50/01 |
| 11,347,388 B1 | 5/2022 | Holland et al. | |
| 2014/0053110 A1 * | 2/2014 | Brown | G06F 3/0481 715/853 |
| 2014/0081692 A1 | 3/2014 | Bickell et al. | |
| 2014/0095237 A1 * | 4/2014 | Ehrler | G06Q 10/105 705/7.15 |

(Continued)

*Primary Examiner* — Hien L Duong
(74) *Attorney, Agent, or Firm* — Brownstein Hyatt Farber Schreck, LLP

(57) ABSTRACT

Embodiments include methods and systems for generating a user interface on a mobile device. The method includes instantiating a client application on the mobile device and causing display of a first graphical user interface within the client application. A set of registered users is identified, the set of users having a hierarchical relationship to a first user account associated with the first user. The graphical user interface displays a set of avatar icons, which corresponds to the set of registered users. In response to a selection of a particular avatar icon of the set of avatar icons, the system accesses particular issue state data associated with a particular user account of the particular avatar icon and causing display of a second graphical user interface comprising a first overlay card that includes the particular avatar and at least a portion of the particular issue state data.

20 Claims, 8 Drawing Sheets

(56) References Cited

U.S. PATENT DOCUMENTS

| | | | |
|---|---|---|---|
| 2015/0317574 A1* | 11/2015 | Hull | G06Q 10/067 |
| | | | 705/348 |
| 2016/0189077 A1 | 6/2016 | Azmoon et al. | |
| 2017/0139890 A1 | 5/2017 | Bendig et al. | |
| 2017/0323267 A1 | 11/2017 | Baek et al. | |
| 2017/0357435 A1 | 12/2017 | Taslimi et al. | |
| 2018/0357728 A1* | 12/2018 | Huening | H04L 67/535 |
| 2019/0124169 A1* | 4/2019 | Sundin | H04L 67/535 |
| 2020/0319758 A1 | 10/2020 | Ding et al. | |
| 2021/0125584 A1 | 4/2021 | Hitzler et al. | |
| 2021/0150489 A1 | 5/2021 | Haramati et al. | |
| 2021/0157978 A1 | 5/2021 | Haramati et al. | |
| 2021/0319389 A1 | 10/2021 | Jafari et al. | |
| 2021/0342785 A1 | 11/2021 | Mann et al. | |
| 2021/0344622 A1 | 11/2021 | Mann et al. | |

* cited by examiner

SYSTEM FOR GENERATING A GRAPHICAL USER INTERFACE ON A MOBILE DEVICE FOR AN ISSUE TRACKING SYSTEM EVENT FEED

CROSS-REFERENCE TO RELATED APPLICATION(S)

This application is a continuation patent application of U.S. patent application Ser. No. 17/853,825, filed Jun. 29, 2022 and titled "System for Generating a Graphical User Interface on a Mobile Device for an Issue Tracking System Event Feed," the disclosure of which is hereby incorporated herein by reference in its entirety.

FIELD

The described embodiments relate to generating issue summaries for issues management by an issue tracking system and, in particular, to systems and methods for creating and displaying issue summaries associated with registered users.

BACKGROUND

Organizations are increasingly using various software products to facilitate communication and workflow for individuals and teams. Issue tracking software may be used to manage and track progress for various project development projects. In many cases, a user may check the status of a project, view, and/or approve recent updates to a project using the issue tracking software. Traditionally, issue tracking software was developed for use with a desktop computer display, which provides a relatively large area for displaying issue data. While some issue tracking software is available for use on mobile devices, it can be difficult to view project updates and issue data on the more limited display. The systems and techniques described herein are directed to a user interface and navigational scheme that reduces drawbacks with some existing systems.

SUMMARY

Embodiments are directed to methods of generating a user interface on a mobile device. The methods can include instantiating a client application on the mobile device and authenticating a first user of the mobile device. In response to instantiating the client application, the methods can include causing the display of a first graphical user interface within the client application in a display of the mobile device and identifying, using an organizational mapping platform including a registry of registered user accounts and a hierarchical relation between registered user accounts, a set of registered users having a hierarchical relationship to a first user account associated with the first user. The methods can further include causing the display of a set of avatar icons in the first graphical user interface of the client application, where each avatar icon of the set of avatar icons corresponds to a respective user account of the set of user accounts and retrieving a set of issue state data from an issue tracking platform, the issue state data associated with the first user account. In response to a selection of a particular avatar icon of the set of avatars icons, the methods can include accessing, from the issue tracking platform, particular issue state data associated with a particular user account of the particular avatar icon and causing display of a second graphical user interface comprising a first overlay card overlaying the first graphical user interface. The first overlay card can include a first graphical region including the particular avatar and a second graphical region including at least a portion of the particular issue state data.

Embodiments can also include methods of providing updates on a mobile device. The methods can include instantiating a client application on the mobile device and authenticating a first user of the mobile device. In response to instantiating the client application the methods can include identifying, using an issue tracking system, a set of registered user accounts of users that have contributed to issues that are associated with a first user account of the first user and causing the display of a set of avatar icons in a first graphical user interface within the client application of the mobile device, each avatar icon of the set of avatar icons corresponding to a respective user account of the set of registered user accounts. In response to a selection of a particular avatar icon of the set of avatar icons, the methods can include retrieving particular issue state data from an issue tracking platform, the issue state data associated with a particular user account associated with the particular avatar icon and causing display of a second graphical user interface comprising a first overlay card overlaying the first graphical user interface. The first overlay card includes a first graphical region including the particular avatar and a second graphical region includes at least a portion of the particular issue state data.

Embodiments are further directed to a server system that includes a memory allocation defined by a data store, one or more executable assets, a working memory allocation, and a processor allocation configured to load the one or more executable assets from the data store into the working memory to instantiate an instance of a client application. The client application may authenticate a first user of the mobile device and cause display of a first graphical user interface within the client application in a display of the mobile device. The client application may be configured to identify, using an organizational mapping platform comprising a registry of registered user accounts and a hierarchical relation between registered user accounts, a set of registered users having a hierarchical relationship to a first user account associated with the first user, and cause the display of a set of avatar icons in the first graphical user interface of the client application, each avatar icon of the set of avatar icons corresponding to a respective user account of the set of user accounts. In response to a selection of a particular avatar icon of the set of avatar icons, the client application may access, from the issue tracking platform, particular issue state data associated with a particular user account of the particular avatar icon and associated with the first user account and cause display of a second graphical user interface including a first overlay card overlaying the first graphical user interface. The first overlay card may include a first graphical region including the particular avatar, and a second graphical region including at least a portion of the particular issue state data.

BRIEF DESCRIPTION OF THE DRAWINGS

The disclosure will be readily understood by the following detailed description in conjunction with the accompanying drawings, wherein like reference numerals designate like structural elements, and in which.

Figure 1:
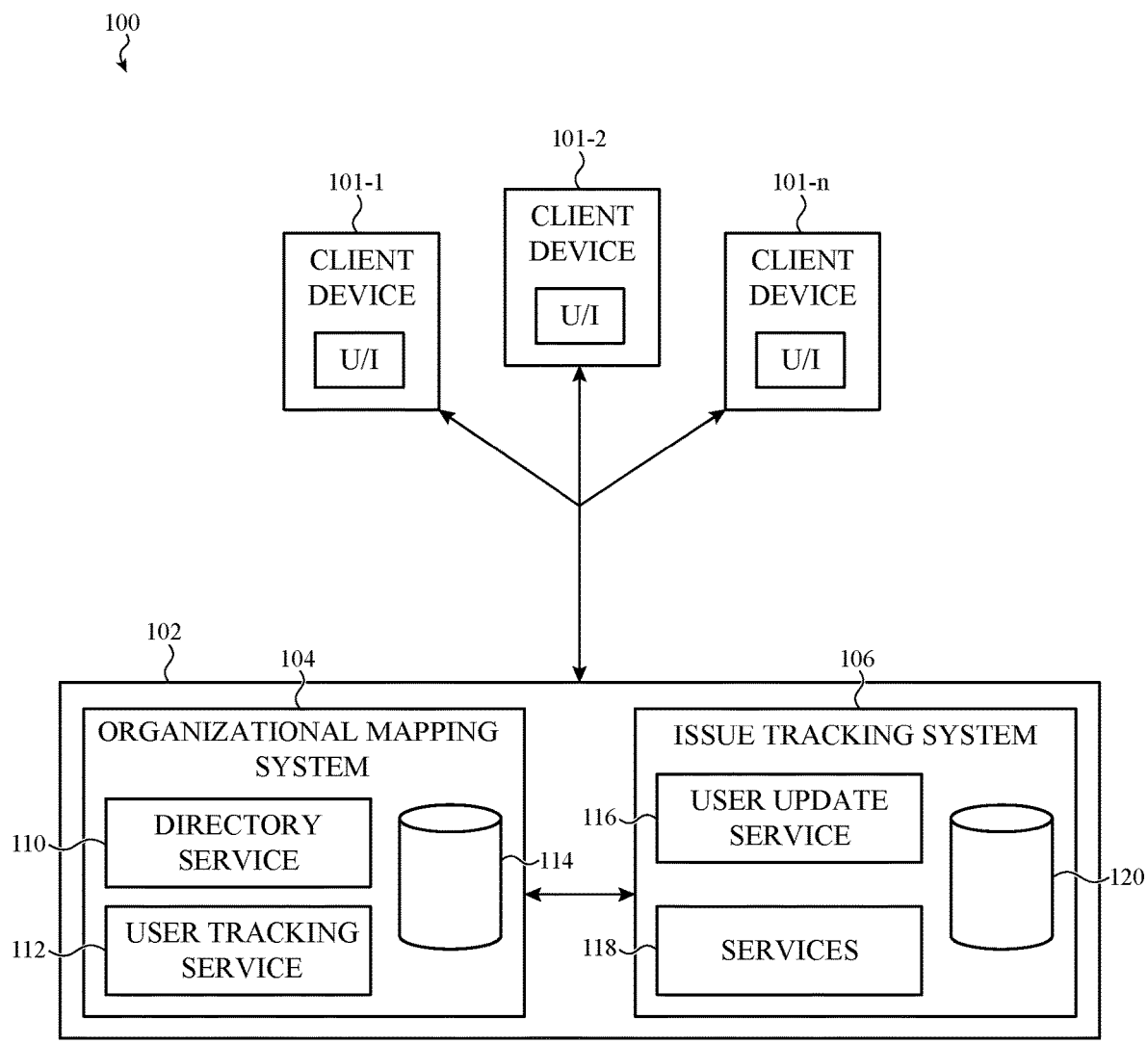
FIG. 1 shows an example networked computer system in which various features of the present disclosure may be implemented.

While the invention as claimed is amenable to various modifications and alternative forms, specific embodiments are shown by way of example in the drawings and are described in detail. It should be understood that the drawings and detailed description are not intended to limit the invention to the particular form disclosed. The intention is to cover all modifications, equivalents, and alternatives falling within the scope of the present invention as defined by the appended claims.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to systems and methods for generating user-specific updates at a client device for software development projects managed by an issue tracking service (also referred to as an "issue tracking system"). In general, the system may include a dedicated application platform (also referred to as a "client application") for the issue tracking system and/or other application platforms. The issue tracking system may have a dedicated GUI scheme and/or a set of tools for generating, modifying, or otherwise interacting with issues managed by the issue tracking system.

The issue tracking system may include a user update service that generates update summaries based on a user's interactions with the issue tracking system. The update summaries may be generated for a first user, such as a manager/supervisor on a project, on a second user's interactions with the issue tracking system. For example, the update summaries may include information related to recent projects worked on by a user, the user's contributions to these projects, a status and/or status updates, whether a project is waiting review or waiting for some other input from the first user, and/or the like.

The update service may generate a GUI that includes a set of avatar icons (also referred to as "avatars") for other users of the system and that are associated with the first user. For example, the avatars may correspond to other users who work on various issues with the first user. The first user may select an avatar and the user update service may display an update summary of issue data for a user associated with the avatar. The update summary may be displayed as an overlay card that overlays a first graphical user interface of the client application. In some cases, the overlay card may display the avatar in a first graphical region and display a set of issues in a second graphical region. The set of issues may be recent issues that the user associated with the avatar has worked on or otherwise interacted with. In some cases, the set of issues may include issues that are associated with the first user. For example, the issues may be issues that require the first user's input, such as approval of a change to the issue and/or review of an update to the issue.

The overlay card may display a summary for each issue in the set of issues, which may include a title and/or other identification associated with the issues, a status of the issue, if any input is required from the first user, and so on. Each issue summary may be a selectable item and the user can select an issue summary to view additional information about the issue. For example, selecting a particular issue summary from the set of issue summaries on the overlay card may cause the client application to display another overlay card that includes additional data for the selected issue. This additional overlay card may include additional information about the issue, which can include a description of the issue, attachments to the issues, a list of linked issues, recent updates or changes to the issue, a current status, whether the issues require input or approval, and/or the like. In some cases, the overlay card may display the full issue details or a summary of the full issue details. In some cases, the overlay card including the set of issues and/or the additional overlay card may include an option to view the full issue details, which may cause the client device to open a different client application or GUI for the viewing and updating issues.

In some cases, closing the overlay card associated with a particular user may cause the client application to display a home graphical screen that includes a region displaying multiple avatars for users of the system. The first user may be able to select a different avatar to view an update summary for the user associated with the selected avatar. Accordingly, the system may generate update summaries that are specific to each user of the system. In some cases, each of these update summaries may be based on a relationship of the first user (associated with the client device) to the selected user. For example, the update summaries may include issues that both the first user and the selected user are assigned to, have contributed to, or are otherwise associated with.

In some cases, the avatars for each user may be arranged according to a ranking. The ranking may be user defined, may be based on recent activity of the first user in relation to the other users of the system, may be based on a hierarchical relationship of the first user to other users (e.g., supervisor, supervisee relationships), may be based on whether an input is required from the first user, and so on. In some cases, the client application may display the avatars according to the ranking and include navigation controls for viewing the avatars. For example, the client application may display a portion of the avatars on a home screen and include controls for viewing additional avatars. A user may use a swipe input to scroll through the avatars. In some cases, the overlay card associated with an avatar may also have navigation controls. For example, a user may select an avatar to view an overlay card including the issue summary data for the particular user associated with the selected avatar. The user may be able to swipe on the overlay card, which causes the system to display a different overlay card for a next user in accordance with the ranking of the users. Accordingly, the user may navigate between overlay cards to view update summaries for various users.

The client application may be a dedicated application that is designed for use with a corresponding backend application. For example, an issue tracking service may include a backend system that tracks and manages issues and one or more client applications that interface with the backend system and provide user interaction schemes and/or UIs on different types of client devices. For example, a dedicated client application can include a mobile application that is configured to run a particular mobile software system. In other cases, a dedicated client application can include a desktop application that is configured to run on a particular desktop software system. Alternatively, the client application may be implemented using a mobile web browser or general web browser that is configured to communicate with and provide an interface for the backend application via web-based protocols such as JavaScript or other suitable web protocols.

Generally, the systems described and referenced herein may generate a content item for each item that is entered into the system. For example, an issue tracking service may generate a ticket or issue number which can be used to track an issue as it is worked on by one or more users of the system. Accordingly, each issue may be associated with a particular set of users. Interactions for various issues can be tracked and updated on a continuous basis. These updates may be used to generate the update summaries for the first user.

These and other features of an issue tracking system are described herein. While certain example application environments are used to illustrate the features of the event feed service, these are provided for example purposes only. Indeed, the user update services described herein may generate update summaries for, recommend item sources from, and display update summaries in numerous different types of software applications and/or services, including but not limited to messaging applications (e.g., instant message applications, email applications, group-messaging applications, etc.), wiki applications, sales management applications, project management applications, source code control applications (e.g., for managing, creating, and/or editing source code for computer programs, websites, etc.), human resources applications, or the like.

These and other embodiments are discussed below with reference to FIGS. 1-6. However, those skilled in the art will readily appreciate that the detailed description given herein with respect to these Figures is for explanatory purposes only and should not be construed as limiting.

FIG. 1 shows an example networked computer system 100 (also referred to as "system 100") in which various features of the present disclosure may be implemented. The system 100 includes an application platform 102 and client devices 101 (101-1, . . . , 101-n) that communicate via a network (e.g., the Internet). The client devices 101 may be any suitable type of device, including but not limited to a desktop or laptop computer, tablet computer, mobile phone, personal digital assistant, smart device, voice-based digital assistant, or the like.

The application platform 102 may be or may include one or more servers, content stores (e.g., databases), communications systems, data structures, programs, or other components, systems, or subsystems that provide services described herein. The application platform 102 may include an organizational mapping system 104 and an issue tracking system 106.

The organizational mapping system 104 may include a directory service 110, a user tracking service 112, and a user profile database 114. The organizational mapping system 104 may be configured to manage user accounts of a set of registered users of the system 100 and include data related to the user accounts. For example, the directory service 110 may include a registry of registered user accounts, which may include login/authentication information for a user, user profile data including user identification(s), teams that a user is associated with, contact information for a user, and so on. The directory service 110 may store data that defines a hierarchical relationship between users of the system. For example, the hierarchical relationship data may define working relationships between users, such as reporting/supervising relationships. The hierarchal relationship data may define roles for various users of the system and dependencies between the different roles. The hierarchical relationship data may define relationships between different teams/groups of users. For example, the hierarchical relationship data may be stored in a node graph or any other suitable relational data structure.

The user tracking system 112 may monitor and track users' interactions with the system 100. For example, the user tracking system 112 may monitor a user's interaction with various issues including an issue that a user is assigned to, changes made to the issues, updates to various issues, requests, and so on. The user tracking system 112 may store data related to a user's interactions with the system 100 in the user profile database. In some cases, this tracked data may be used to determine associations between various users of the system. For example, the user tracking system 112 may use the tracked data to determine users that have worked on the same issue, interactions between users such as requests to review/approve updates made to issues, and so on. In some cases, user interactions with the system may be strode in user event logs, application history log, or any other suitable type of data store.

The issue tracking system 106 may include a user update service 116, one or more application services 118 and a data store 120. The application services 118 and data stores 120 may facilitate the creation, deletion, management, editing, serving, and/or other services related to the issues, content, and/or content items associated with that software application and stored in the data store 120. The application services 118 may also generate events or messages in response to changes or activity occurring with respect to the issue tracking system 106. Data store 120 may be databases or other data storage resources that store content items and/or other data related to the issue tracking system 106. The issue tracking system 106 may be associated with dedicated servers or server systems. The issue tracking system 106 may also be implemented using a software as a service (SaaS) architecture which may be accessed by a client device 101 via a web browser or other similar client application.

The issue tracking system 106 may request data from one of more other systems such as the organizational mapping system 104 using one or more application programming interface (API) calls or other suitable request. For example, the user update service 116 may request a set of avatars or other user data associated with various user accounts from the directory service 110 using one or more API calls. The user update service 116 may request/retrieve issue data from the issue data store 120 or other services 118 and cross-reference data received from the organizational mapping system 104 with the issue data stored at the issue tracking system 106.

The issue tracking system 106 tracks issues or discrete aspects of a development project or other process using tickets or an issue number. In some cases, the issue tracking system 106 may track issues (e.g., associated with a ticket), task or other discrete actions that may be performed for a project or undertaking. Information related to the various issues (referred to herein as "issue data") may be stored in the data store 120. In general, issues are tracked along a workflow or set of issue states from initiation to resolution. Issue data may include various content including, for example, a user-generated description of an issue, issue status (e.g., closed, open, awaiting review), assignee, supervisor or reviewer, related user, issue urgency, issue age or pendency, images, links to code, and other issue-related content. Each issue and, in some cases each state, may be associated with a different assignee or user responsible for completing the issue or state. In some cases, issue data may include user-generated specifications of issues in computer code of software products. Issue data may be stored in the data store 120 as files, data structures, data objects, or the like. In some cases, the issue data may include an issue description, assignee, team members, state data, status data, references to other issue or content, or any other suitable information associated with the issue.

Issues managed by the issue tracking service may be associated with a project, various users, and/or one or more teams or groups of users. For example, a project may include a set of issues and the issues may be organized based on a workflow and/or dependency of issues on each other. Accordingly, some issues may need to be addressed before other issues can be completed (or started). In some cases, issues may have one or more states (e.g., active, pending, not started, complete, and so on) and can be changed from a first state (e.g., pending) to a second state (e.g., active). In some cases, one or more users can change a state of an issue, which may cause an event communication to be sent to the event feed service. Accordingly, as issue states are changed, the event feed service may update feed items to reflect these changes.

The application services 118 of the issue tracking system may facilitate content services related to the issues, including causing user interfaces of the issue tracking system to be displayed to a user on a client device 101, receiving user inputs relating to the creation and/or modification of issues (e.g., changing status, receiving content related to the issue and/or issue resolution, etc.), changes to issue status, changes to user assignments, and the like. The application services 118 may also send event notifications or other communications related to events (which also may be referred to as "event communications") caused by activity related to the various issues being tracked by the issue tracking system 106.

The system 102 may be accessible by client devices operating either a dedicated client application or a web browser configured to interface with the system 102 via a web-based protocol. For example, one or more client devices can include a client application the communicates with the system 102 to retrieve and send data to the system 102 based on a user's inputs and/or interactions with the client application. In some cases, a client device may access the system 102 using a web-based browser application, which communicates with the system 102 to retrieve and send data to the system 102 based on a user's inputs and/or interactions with the client application.

While issue tracking systems are used as example software applications, these are merely examples of software applications that may be used with event feed services described herein. Other types of software applications and/or content sources that may provide feed items and about which feed item source recommendations may be generated include, without limitation, collaborative document systems, codebase systems, messaging applications (e.g., instant message applications, email applications, group-messaging applications, etc.), wiki applications, sales management applications, project management applications, human resources applications, or the like.

Figure 2:
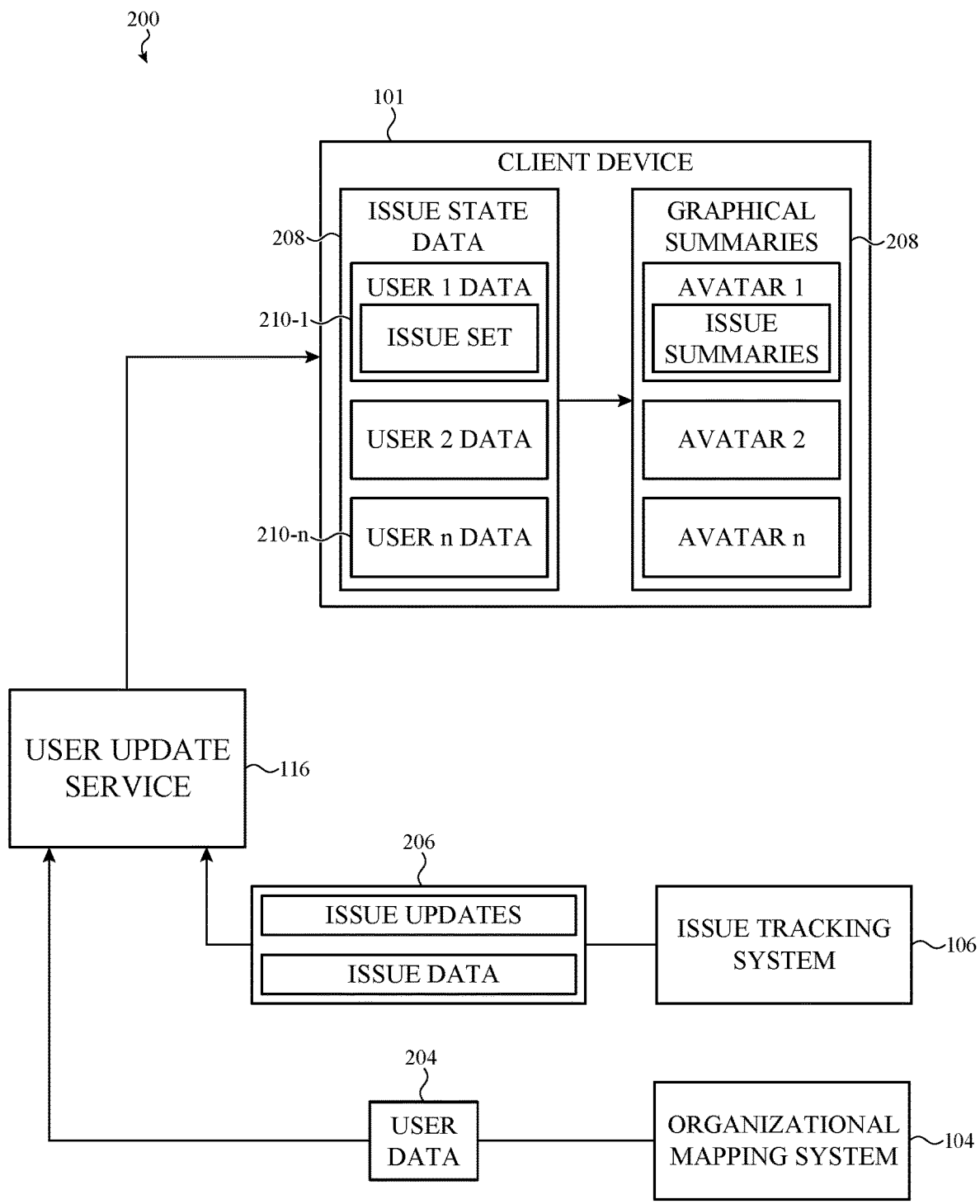
FIG. 2 shows an example operation of an update service that generates user update summaries.

FIG. 2 shows an example operation of the user update service 116 generating user update summaries for display on a client device 101 associated with a first user.

The user update service 116 may receive or issue data 206 from the issue tracking system 106. The data 206 may include information about one or more issues hosted by the issue tracking system 106 and include information such as a textual description of an issue, code indicating the issue, or the like, an identifier of an issue (e.g., an address, a URL, a unique identifier of the issue, a serial number, a file name, etc.), metadata or attributes associated with the issue (e.g., users assigned to the issue, a title of the issue, a type or category of the issue), user inputs associated with the issue (e.g., user inputs that may be included as actionable input objects in an issue), or the like. Additionally or alternatively, the data 206 may include indications of one or more updates to an issue, a user associated with the update, a required user action (e.g., approval/review of an update, and/or the like).

The issue data 206 may also include information that may be used to prioritize or rank issues. For example, notifications 202 may include a date on which an action item is due or is requested to be completed. An issue may be ranked and/or prioritized in a user's update feed based on that date. For example, if the date is not imminent, the issue may be ranked lower in the update feed. If the date is imminent, the issue may be ranked higher in the update feed.

The user update service 116 may request or receive data 206 from the issue tracking system 106 based on a relationship of a first user associated with the client device 101 to other registered users of the system. For example, the user update service may receive user account information for the first user that is associated with the client device 101. The user update service 116 may use the user account information to identify one or more other registered users of the system that are related to the first user by accessing the organizational mapping system 104. For example the update service 116 may receive user data 204 for other registered users that have a defined hierarchical relation to the first users, which may be based on assigned users roles (e.g., a defined reporting scheme). The user update service 116 may retrieve the issue data 206 based on the identified users from the user data 204. For example, the user update service 116 may request issue data 206 from the issue tracking system 106 for all users that have a defined reporting relationship to the first user in the organizational mapping system 104.

In response to receiving the issue data 206 from the issue tracking system, the user update service 116 may send data to the client device 101, which may be used to generate issue state data 208 for a set of users at the client device 101. The issue state data 208 may include user data 210 for each user that is determined to the associated with the first user of the client device. The user data 210 may identify one or more issues associated with each user and include issue data, such as an issue identifier, title of the issue, summary of the issue, timing of the most recent updates to the issue, required inputs from the first user or other users, and so on.

The client device 101 may use the issue state data to generate one or more graphical summaries 208 in a graphical user interface. For example, the client device may receive an avatar for each user in the set of users. The avatars may be displayed on a first graphical interface on the client device 101 and interaction with an avatar may cause the client device to display a graphical summary for issue data of a user associated with the selected avatar. The graphical summaries 208 may include an overlay card for the selected user which is displayed over the first graphical interface. The graphical summaries may include the avatar and a summary of issues that are associated with the selected user.

Figure 3A:
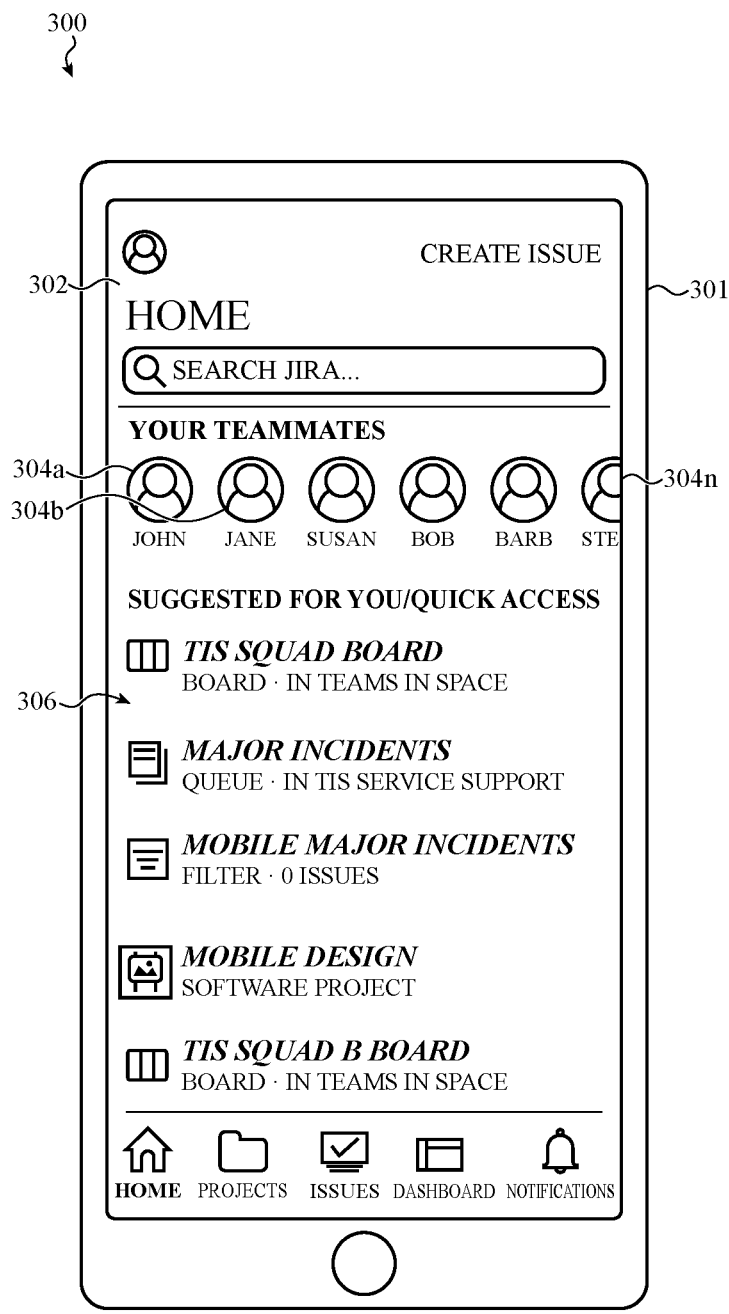
FIG. 3A shows an example of a graphical user interface displayed on a client application of a mobile device.

FIG. 3A shows an example of a graphical user interface displayed on a client application 300 of a client device 301. The client application 300 may display a first graphical user interface 302 that is a home screen for the client application. The first graphical user interface 302 may include various regions that display different types of content to a user. In some cases, the first graphical user interface 302 may include a first region that displays one or more avatars 304, which are each associated with a user of the system. The avatars 304 may be used to provide updates for with a specific user that is associated with a first user that is logged into the client application 300.

The avatars 304 may be displayed in a variety of ways. In some cases, the avatars 304 may be arranged according to a user defined scheme. For example, the first user may add and/or remove avatars 304 from the set of avatars. Additionally or alternatively, the first user may define an ordering of the avatars and, each time that the client application is launched or the first graphical user interface is displayed, the set of avatars 304 is arranged in accordance with the user defined ordering.

In other cases, the system may automatically determine which avatars and/or an ordering of the set of avatars 304, for example, based on the first user's relationship to other registered users of the system. For example, the client application 300 may access an organizational mapping system, such as described herein, to determine a hierarchical relationship of the first user to other registered users of the system. The hierarchical relationship may be based on a user role such as supervisor-supervisee roles, or other defined relationships that are stored in the organizational mapping system. The client application 300 may determine from these relationships users to include in the set of avatars. For example, the system may be configured to include avatars for users that have a defined direct reporting relationship to the first user.

In some cases, the system determines which avatars and/or an ordering of the set of avatars of the set of avatars 304 based on interactions of the users with the system. For example, the system may track user interactions with issues, such as updates, changes, views, and so on. In some cases, the system can determine which users have contributed to various issues. The system may display avatars of users that are assigned to or have detected interactions with issues that the first user is assigned to or has detected interactions with. Accordingly, the client application 300 may display avatars of users that are working on the same issues as the first user. In some cases, the selection of users to include in the set of avatars 304 may be time based. For example, the system may select users to include in the set of avatars 304 for active projects. Accordingly, the set of avatars 304 may update based on the first user's interaction with the issue tracking system and/or other users' interactions with the issue tracking system. In other cases, the system my access interaction logs or determine an interaction history between the one of the more users and the first user. These interactions can be used to determine which users the first user has most interacted with or users associated with issues having the most recent activity. The avatars 304 can be arranged according to the amount of interactions and or based on the determined interactions.

Each avatar may be used to provide updates for a user that is associated with the avatar. For example, if the first user selects a first avatar 304a, the client application may display an update summary for issues that are associated with the corresponding user. Similarly, if the first user selects a second avatar 304b, the client application may display an update summary for issues that are associated with the corresponding user. The update summary can be displayed as an overlay card that overlays the first graphical user interface 302.

The first graphical user interface 302 may also include additional regions, which may include content specific to the first user. For example, the first graphical user interface 302 can include a suggested or quick access section 306, which may display content that is associated with the first user, for example, projects the first user is assigned to, projects or issues that the first user has contributed to, and so on.

Figure 3B:
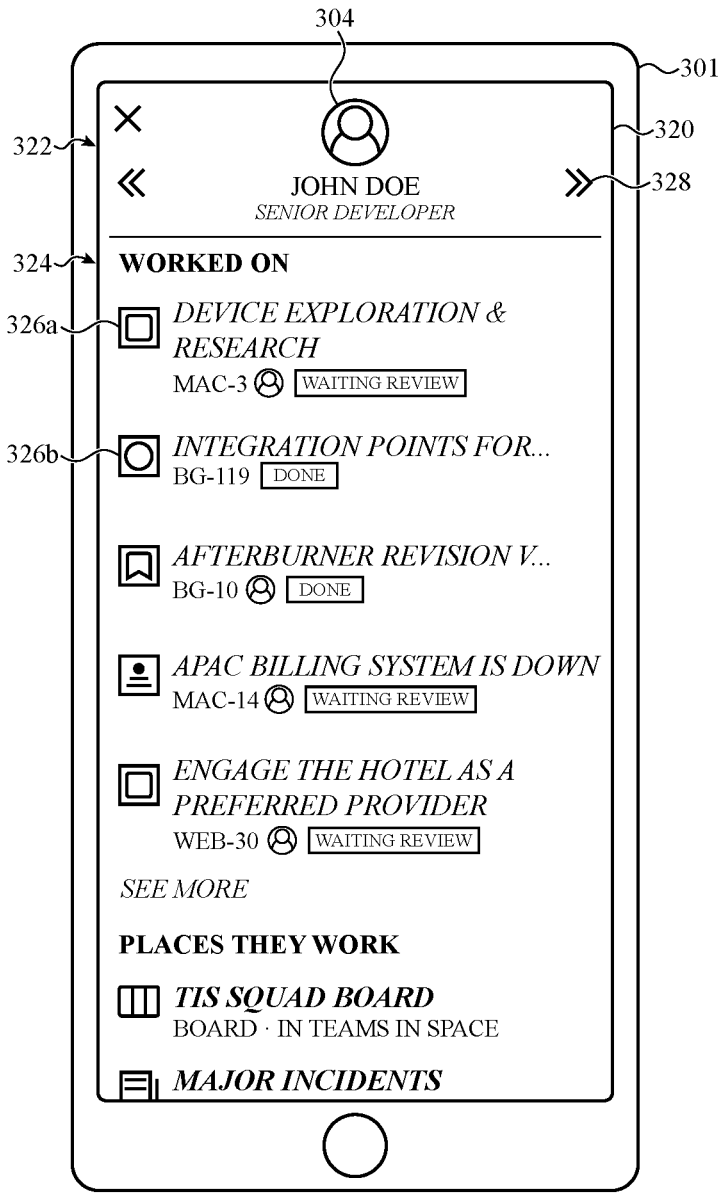
FIG. 3B shows an example of an overlay card displayed in a graphical user interface of a client device.

FIG. 3B shows an example of a graphical overlay card 320 displayed in a graphical user interface of a client device 301. The overlay card 320 may be displayed in response to a user selecting a particular avatar from the first graphical user interface 302, as described herein. The overlay card 320 may include a first graphical region 322 that includes the avatar 304a of the corresponding user. In some cases, the first graphical region 322 may include additional information about the associated user, such as the role of the user (e.g., "Senior Developer") or any other suitable information. This information may be retrieved by the client application from the organizational mapping system.

The overlay card 320 may include a second graphical region 324 that includes issue state data 326 associated with the corresponding user. The issue state data 326 may include issues that the corresponding user is contributing to, issues that the corresponding user is assigned to, or issues that are otherwise associated with the user. In some cases, the displayed issue state data 326 may be time and/or activity based. For example, the client application may select issues that the corresponding user is actively working on (e.g., issues that the user has contributed to within a defined time period), issues that the corresponding user is assigned to and have a specific status (e.g., an active status), and/or the like.

In some cases, the displayed issue state data 326 may include issues that are also associated with the first user. For example, the displayed issue state data 326 may be for issues that the first user is assigned to, has contributed to, issues that are awaiting input (e.g., approval or review) from the first user, and so on. For example, the issue state data 326 may include a first issue 326a that is awaiting review from the first user, and a second issue 326b that was recently completed.

The overlay card 320 may include navigation controls 328, which may allow the first user to view overlay cards for additional users. The navigation controls 328 may include graphical interface elements and/or be gesture based. For example, if the first user swipes to the left or selects an arrow on the right side of the overlay card 320, the client application may display an overlay card for a next user in the set of users. If the first user swipes to the right or selects an arrow on the left side of the overlay card 320, the client application may display an overlay card for a previous user in the set of users. The client application may display a previous or next overlay card based on the ordering of the overlay cards in the first graphical user interface 302. For example, the overlay cards may be advanced in the same order as the order the avatars 304 were displayed in the first graphical user interface 302. In some cases, the navigation can occur directly for one overlay card to the next. Gestures indicating a first direction advances through the avatars and/or corresponding overlay card in a first progression and another gesture indicating an opposite direction to the first direction advances through the order in the opposite progression. For example, as a user swipes, a card animation may be displayed showing the previous card being transitioned off the screen and the next card being transitioned onto the screen.

In some cases, the overlay card 320 may include an option to close the card and/or the user may perform a gesture on a touch-screen (e.g., swipe up) to close the overlay card. In response to the user selecting the option (or performing the gesture) to close the overlay card, the client application may cause the first graphical user interface 302 to be displayed.

Figure 3C:
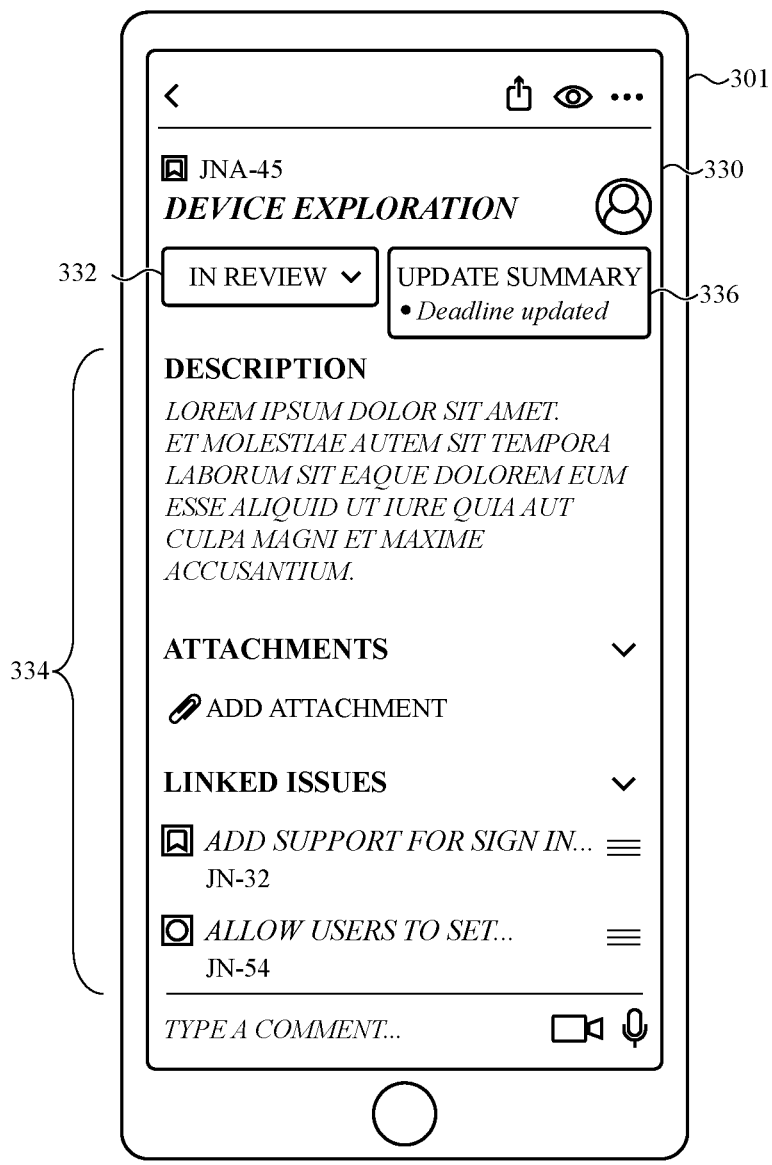
FIG. 3C shows an example of an issue summary displayed in a graphical user interface of a client device.

FIG. 3C shows an example of an issue summary card 330 displayed in a graphical user interface of a client device 301. The issue summary card 330 may be displayed in response to a user selecting a particular issue from the issue state data 326. For example, the first user may select the first issue 326a from the issue state data to display the issue summary card 330 for the first issue 326a. The issue summary card 330 may be displayed as a second overlay card which may be displayed in addition to the overlay card 320 including the issue summary data or as an alternative to the overlay card 320.

The issue summary card 330 may include additional data about the issue such as an updatable status flag 332. For example, the first issue 236a may be in review, and the status flag 332 is configured to reflect this status (e.g., labeled "IN REVIEW"). In some cases, the first user may be able to update the state flag, for example, after viewing the issue, the first user may set the status flag 332 to a reviewed state. The client device may cause the status of the first issue 326a to be updated at the issue tracking system. In some cases, the status update may cause the first issue 326a to be updated or removed from the corresponding overlay card 320.

In other cases, a status or state of the first issue 326a may be updated automatically based on a user interaction with the issue summary card 330. For example, in response to the user selecting the first issue 236a from the overlay card 320 and viewing the issue summary, the client application may automatically cause the issue tracking system to change a status or state of the first issue 326a. This update may also cause the first overlay card 320 to be updated in accordance with the change to in the status of the first issue. Accordingly, as the first user interacts with overlay cards 320 and/or views the issue summary card 330 corresponding to particular issues, the client application may make updates or changes to the corresponding issue at the issue tracking system. As a result, if user interaction with the client application causes changes to an issue, these changes will be propagated through the system. For example, if a user subsequently views the first issue 326a using a different interface, such as using a desktop computer, the desktop computer will display the first issue 326a data in accordance with the updates made through the client application.

The issue summary card 330 may include additional data 334 related to the particular issue (e.g., the first issue 326a), which may be retrieved by the client application from the issue tracking system. In some cases, the additional data 334 may be retrieved in response to the user selecting the particular issue from the first overlay card (e.g., using one or more API calls). The additional data 334 can include a description of the particular issue, attachments associated with the issue, linked issues or references to other related content or resources, or any other suitable information associated with the issue. In some cases, the additional data 334 may include information about users that are associated with the issue, a history of updates, and so on.

In some cases, the issue summary card 330 may include a graphical element 336 that provide a summary or indication of the most recent changes to the corresponding issue. The graphical element 336 may be displayed over a portion of the issue summary card 330 and may be cleared or disappear after a predetermined time, in response to a user input to the client device 301, or in response to some other action taken by the user. The graphical element 336 may alert the first user as to which aspects of the issue have recently changed and/or require the first user's attention.

In some cases, the issue summary card 330 may include an option to close the card and/or the user may perform a gesture on a touch-screen (e.g., swipe up) to close the issue summary card 330. In response to the user selecting the option (or performing the gesture) to close the overlay card, the client application may cause the first graphical user interface 302 to be displayed or the first overlay card 320 to be displayed.

Figure 4:
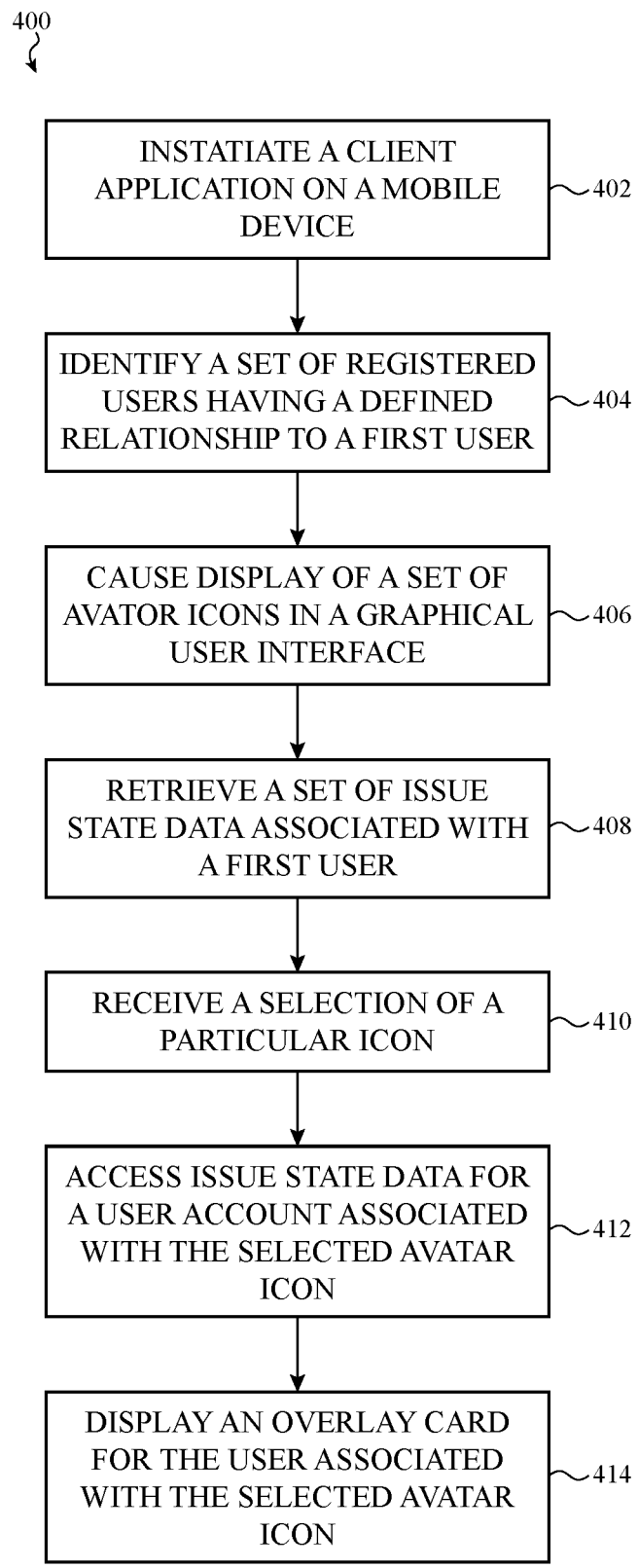
FIG. 4 shows an example process for displaying avatar icons and generating overlay cards in a client application on a client device associated with a user.

FIG. 4 shows an example process 400 for displaying avatar icons and generating overlay cards in a client application on a client device associated with a first user. The avatar icons and overlay cards may be generated for other registered users of the system as described herein.

At operation 402, the process 400 includes instantiating a client application on a mobile device. The client application can be launched in response to a user input such as an input to an icon displayed on the mobile device and associated with the client application. Part of launching the client application can include authenticating a user of the mobile device (also referred to herein as "a first user"). The authentication procedure can include providing the client device with a set of login credentials such as a username and password. However, the authentication procedure can be performed in any suitable manner including using biometric authentication, single sign on procedures, and so on.

At operation 404, the process 400 includes identifying a set of registered users having a defined relationship to a first user that is associated with the client device. In some cases, operation 404 may be performed as part of instantiating the client application. Operation 404 can include accessing an organizational mapping platform that comprises a registry of registered user accounts, as described herein. The organizational mapping platform may include information defining hierarchical relationships between registered user accounts of the system, which may include roles for each user, a relation of the roles (e.g., reporting relationships), and other suitable user parameters.

In some cases, the system can identify registered users of the system that report to the first user, registered users that are contributing to the same issues as the first user and/or registered users that are otherwise associated with the first user. In some cases, identifying the set of registered users may be time based. For example, the system may be configured to identify registered users that are actively working on issues that are associated with the first user. For example, the system can be configured to identify registered users that have viewed, modified, contributed to, or otherwise interacted with an issue that the first user is assigned a supervisor role. Accordingly, the set of registered users may include users that are contributing to issues that the first user is managing.

At operation 406, the process 400 includes causing the display of a set of avatar icons in a graphical user interface of the client application. The set of avatar icons can correspond to the set of users that are identified at operation 406. For example, each avatar icon of the set of avatar icons may correspond to a respective registered user account of the set of user accounts. The set of avatar icons may be displayed in the home screen as described herein, for example, with reference to FIG. 3A.

At operation 408, the process 400 includes retrieving a set of issue state data associated with the first user of the client device. The client application may access the issue tracking system to identify issues that the first user is associated with, which may include issues that the first user is assigned to and/or issues that the first user has interacted with (e.g., viewed, modified, or otherwise contributed to). The retrieved set of issue data may be used to generate an issue summary for a particular user which may include displaying issue state data for the particular user on an overlay card as described herein. For example, the retrieved issue state data for the first user may be used to determine overlapping issues with registered users whose avatar icons are displayed on the home screen of the client application. Accordingly, the issue summaries displayed on the overlay card may be dynamically generated to include information that is relevant to both the first user and the particular user associated with the overlay card.

At operation 410, the process 400 includes receiving a selection of a particular avatar icon of the set of avatar icons. The set or a portion of the set of avatar icons may be displayed on the home screen of the client application in response to instantiating the client application on the mobile device. The first user of the client device may select a particular avatar icon of the displayed avatar icons to view an issue update summary for the particular users. The selection of different avatar icons results in an issue summary for a registered user associated with the selected avatar icon.

At operation 412, the process 400 includes accessing issue state data for a user account associated with the selected avatar icon. This may include the client device requesting from the issue tracking system issue data for a particular user that corresponds to the selected avatar icon. In some cases, the client device may send an identification of the particular user and receive a set of issue information for issues that the particular user is associated with. This may include issues that the particular user is assigned to and/or issues that the particular user has interacted with. For example, the issue tracking system may use user account data for the particular user to identify issues that the particular user has viewed, made changes to, edited, is assigned to, or has otherwise contributed to.

The issue tracking system may return a set of issue state data for the identified issues. The issue state data may identify each issue, provide details such as a title, summary or other information about the issue, and/or other details. In some cases, the client application may specify, in the request to the issue tracking system, specific issue state data to be returned by the issue tracking system. For example, the client application may request identification data (e.g., serial number, issue ticket number, issue title, or the like) for issues that are associated with the user, identification data for other user accounts that are associated with the issue, a status of the issue, and/or the like.

At operation 414, the process 400 includes displaying an overlay card for a user associated with the selected avatar icon. The overlay card may include a summary of issues for the particular user that are relevant to the first user. The overlay card may include a first graphical region to include identifying information for the particular user, such as the user's avatar, a name and/or title of the user, and so on.

The overlay card may also include a second graphical region that includes a portion of the particular issue state data. In some cases, the particular issue state data included in the second graphical region may include a list of the most recent issues that the particular user has interacted with in the issue tracking system. The list may identify each issue (e.g., by title), provide a ticket number or other issue system tracking information, a status of the issue, or other relevant issue data. In some cases, each issue may indicate the last contribution by the user to the issue. For example, each issue may include a summary of an action performed by the user.

Additionally or alternatively, the particular issue state data may include issues that are associated with both the particular user and the first user. For example, the particular issue state data may include a list of issues in which the first user and the particular user are assigned to different roles. For example, the first user may be assigned a supervisor/reviewer role and the particular user may be assigned a development/contributor role. In some cases, the particular issue state data may include issues that are associated with the particular user and awaiting an action from the first user. For example, the particular user state data may include issues that are waiting to be reviewed and/or approved by the first user. Accordingly, the system can be configured to display issue state data that is based on a defined roles for the first user and the particular user and/or based on each of the user's interaction with the issue management system. For example, the system is configured to identify a set of issues having both the first user and second user associated with a particular issue (e.g., names as an assignee, reviewer, team member, or other appropriate role).

Figure 5:
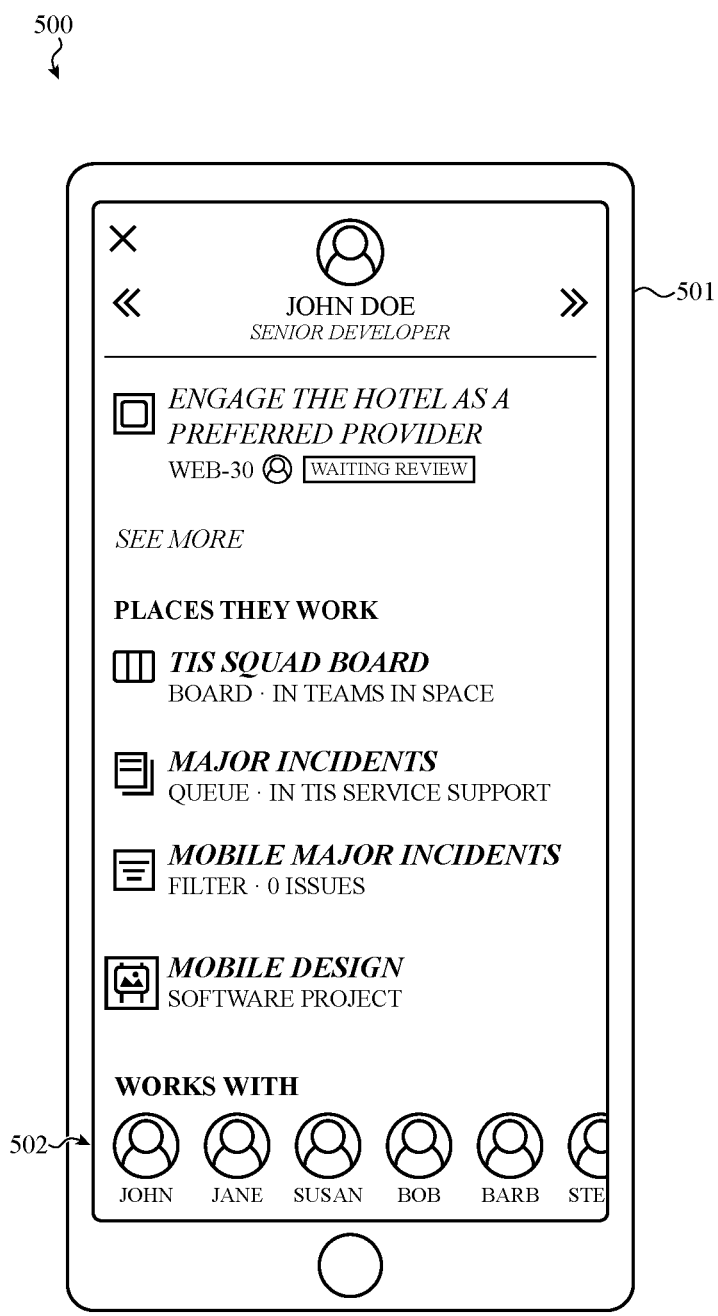
FIG. 5 shows an example of an overlay card displayed in a graphical user interface of a client device.

FIG. 5 shows an example of an overlay card 500 displayed in a graphical user interface of a client device 501. The overlay card may be an example of the overlay cards described herein and be granted by a client application operating on the client device as described herein.

In some cases, the overlay card 500 may be displayed in response to, a first user that is associated with the client device, selecting an avatar of a particular user to generate a summary of issues for that particular user, as described herein. The overlay card 500 may include a graphical region 502 that displays avatars for a set of additional users that is associated with the particular user. For example, the client device may query an issue tracking system and/or an organizational mapping platform to identify a set of additional users that are associated with the particular user. Accordingly, the overlay card may display the avatars of users who may not be directly associated with the first user or displayed in the first user's set of avatars. This may allow the first user to view other users who may be working on similar issues and/or in overlapping areas. In some cases, selecting an avatar from the set of additional avatar cards may cause the client device to display a summary for the particular user associated with the avatar card.

Figure 6:
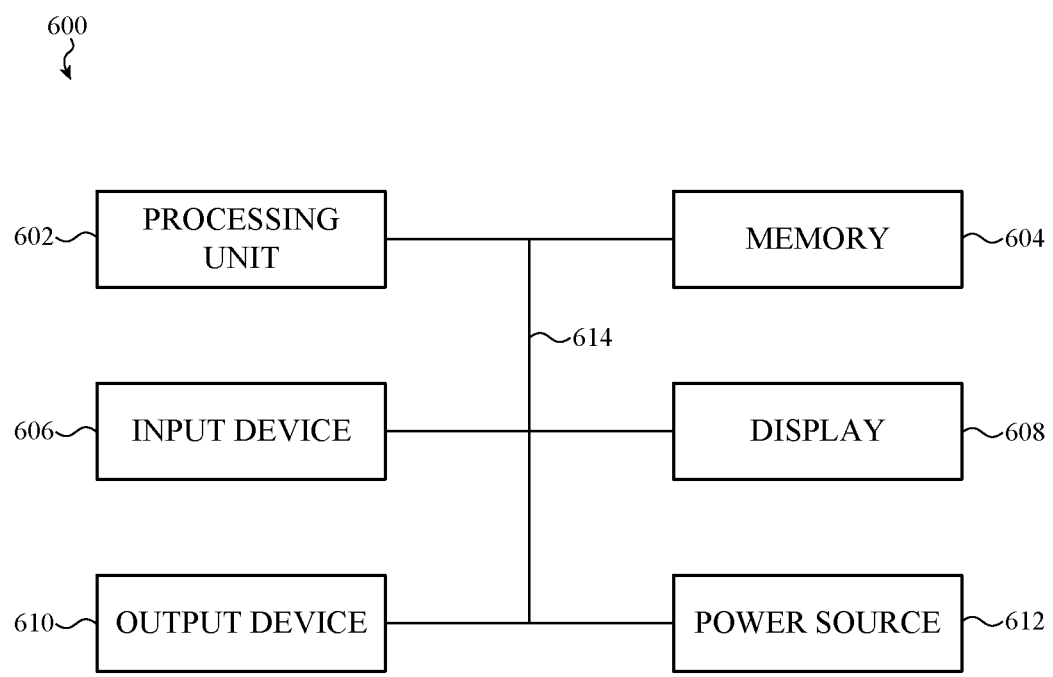
FIG. 6 shows an example electrical block diagram of an electronic device that may perform the operations described herein.

FIG. 6 shows an example electrical block diagram of an electronic device that may perform the operations described herein. The electronic device 600 may in some cases take the form of any of the electronic devices described with reference to FIGS. 1-5, including client devices, and/or servers or other computing devices associated with the system 100. The electronic device 600 can include one or more of a processing unit 602, a memory 604 or storage device, input devices 606, a display 608, output devices 610a-, and a power source 612. In some cases, various implementations of the electronic device 600 may lack some or all of these components and/or include additional or alternative components.

The processing unit 602 can control some or all of the operations of the electronic device 600. The processing unit 602 can communicate, either directly or indirectly, with some or all of the components of the electronic device 600. For example, a system bus or other communication mechanism 614 can provide communication between the processing unit 602, the power source 612, the memory 604, the input device(s) 606, and the output device(s) 610.

The processing unit 602 can be implemented as any electronic device capable of processing, receiving, or transmitting data or instructions. For example, the processing unit 602 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 600 can be controlled by multiple processing units. For example, select components of the electronic device 600 (e.g., an input device 606) may be controlled by a first processing unit and other components of the electronic device 600 (e.g., the display 608) may be controlled by a second processing unit, where the first and second processing units may or may not be in communication with each other.

The power source 612 can be implemented with any device capable of providing energy to the electronic device 600. For example, the power source 612 may be one or more batteries or rechargeable batteries. Additionally or alternatively, the power source 612 can be a power connector or power cord that connects the electronic device 600 to another power source, such as a wall outlet.

The memory 604 can store electronic data that can be used by the electronic device 600. For example, the memory 604 can store electronic data or content such as, for example, audio and video files, documents and applications, device settings and user preferences, timing signals, control signals, and data structures or databases. The memory 604 can be configured as any type of memory. By way of example only, the memory 604 can be implemented as random access memory, read-only memory, Flash memory, removable memory, other types of storage elements, or combinations of such devices.

In various embodiments, the display 608 provides a graphical output, for example associated with an operating system, user interface, and/or applications of the electronic device 600 (e.g., a chat user interface, an issue-tracking user interface, an issue-discovery user interface, etc.). In one embodiment, the display 608 includes one or more sensors and is configured as a touch-sensitive (e.g., single-touch, multi-touch) and/or force-sensitive display to receive inputs from a user. For example, the display 608 may be integrated with a touch sensor (e.g., a capacitive touch sensor) and/or a force sensor to provide a touch- and/or force-sensitive display. The display 608 is operably coupled to the processing unit 602 of the electronic device 600.

The display 608 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 608 is positioned beneath and viewable through a cover that forms at least a portion of an enclosure of the electronic device 600.

In various embodiments, the input devices 606 may include any suitable components for detecting inputs. Examples of input devices 606 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 606 may be configured to detect one or more particular types of input and provide a signal (e.g., an input signal) corresponding to the detected input. The signal may be provided, for example, to the processing unit 602.

As discussed above, in some cases, the input device(s) 606 include a touch sensor (e.g., a capacitive touch sensor) integrated with the display 608 to provide a touch-sensitive display. Similarly, in some cases, the input device(s) 606 include a force sensor (e.g., a capacitive force sensor) integrated with the display 608 to provide a force-sensitive display.

The output devices 610 may include any suitable components for providing outputs. Examples of output devices 610 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 610 may be configured to receive one or more signals (e.g., an output signal provided by the processing unit 602) and provide an output corresponding to the signal.

In some cases, input devices 606 and output devices 610 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 602 may be operably coupled to the input devices 606 and the output devices 610. The processing unit 602 may be adapted to exchange signals with the input devices 606 and the output devices 610. For example, the processing unit 602 may receive an input signal from an input device 606 that corresponds to an input detected by the input device 606. The processing unit 602 may interpret the received input signal to determine whether to provide and/or change one or more outputs in response to the input signal. The processing unit 602 may then send an output signal to one or more of the output devices 610, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed only for legitimate, agreed-upon, and reasonable uses.

Example computing resources or appliances that may be configured to perform the methods described herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed for leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated for leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of generating a user interface on a mobile device, the method comprising:
in response to instantiating a client application on the mobile device and authenticating a first user account at the mobile device:
causing display of a first graphical user interface within the client application on a display of the mobile device;
generating and submitting a first request of an organization mapping system, the first request requesting other user accounts having a hierarchical relationship with the first user account;

receiving in response to the first request, from the organizational mapping system, a first set of other user accounts different from the first user account;

generating and submitting a second request to an issue tracking system, the second request including an identifier corresponding to the first user account;

receiving in response to the second request from the issue tracking system:

an indication of one or more issues associated with the first user account, the one or more issues identified based on a respective status satisfying a status criteria;

a second set of other user accounts different from the first user account, each identified using issue data associated with the one or more issues; and mutual issue data for the one or more issues that are associated with the first user account and at least one of the second set of other user accounts;

causing display of a first graphical region in the first graphical user interface, the first graphical region comprising a set of avatar icons, each avatar icon of the set of avatar icons corresponding to a respective user account of at least one of the first set or the second set of other user accounts; and causing display of a second graphical region in the first graphical user interface, the second graphical region comprising the mutual issue data received from the issue tracking system;

in response to a selection of an particular avatar icon of the set of avatar icons:

sending, to the issue tracking system, a third request for other issue data that is associated with a particular user account corresponding to the selected avatar icon; and causing display of a second graphical user interface comprising a first overlay card on the display of the mobile device, the first overlay card replacing the first graphical user interface on the display of the mobile device and comprising a third graphical region including the selected avatar icon, and a fourth graphical region including the other issue data.

2. The method of claim 1, wherein causing the display of the second graphical user interface comprises causing display, in the first overlay card, a set of links each associated with an issue identified from the issue data.

3. The method of claim 2, wherein each link of the set of links causes generation of an additional overlay card that includes data related to a respective issue associated with a selected link.

4. The method of claim 3, wherein:

the additional overlay card comprises an updatable status flag; and in response to a user input with respect to the updatable status flag, causing a status of the respective issue to be updated at the issue tracking system.

5. The method of claim 3, further comprising, causing display of a set of update summaries in the second graphical user interface, wherein:

each update summary of the set of update summaries is displayed in conjunction with a link of the set of links; and each update summary indicates a recent change to the respective issue.

6. The method of claim 2, further comprising:

determining an urgency of a respective issue associated with each link of the set of links using the issue data; and arranging the set of links in accordance with the urgency of the respective issue.

7. The method of claim 1, wherein causing the display of the set of avatar icons in the first graphical user interface of the client application comprises:

determining an order of the first set and the second set of other user accounts; and displaying the set of avatar icons in accordance with the determined order.

8. The method of claim 7, wherein the determined order is based on a number of issues that are associated with a respective user of the second set of other user accounts and the first user account.

9. The method of claim 7, wherein the determined order is based on an urgency of one or more issues that are associated with a respective user of the second set of other user accounts and the first user account.

10. A method of providing updates on a mobile device, the method comprising:

in response to instantiating a client application on the mobile device and authenticating a first user account associated with a user of the mobile device:

generating and submitting a first request of an organization mapping system, the first request requesting other user accounts having a hierarchical relationship with the first user account;

receiving in response to the first request, from the organization mapping system, a first set of other user accounts different from the first user account;

generating and submitting a second request to an issue tracking system, the second request including an identifier corresponding to the first user account;

receiving in response to the second request, from the issue tracking system:

an indication of one or more issues associated with the first user account, the one or more issues identified based on each issue having a respective status satisfying a status criteria; and a second set of other user accounts different from the first user account, each identified using issue data associated with the one or more issues; and mutual issue data for the one or more issues that are associated with the first user account and at least one of the second set of other user accounts;

causing display of a set of avatar icons in a first graphical user interface within the client application of the mobile device, each avatar icon of the set of avatar icons corresponding to a respective user account of at least one of the first set or the second set of other user accounts; and causing display of the mutual issue data received from the issue tracking system in the first graphical user interface;

in response to a selection of a particular avatar icon of the set of avatar icons, causing display of a second graphical user interface, the second graphical user interface replacing the first graphical user interface and comprising:

the particular avatar icon; and first other issue data for issues that are associated with the first user account and a particular user account associated with the particular avatar icon;

in response to an input to the mobile device associated with a navigation to a next avatar icon of the set of avatar icons, causing display of a third graphical user interface comprising:
the next avatar icon; and
second other issue data for issues that are associated with the first user account and a next user account associated with the next avatar icon.

11. The method of claim 10, wherein:
the second graphical user interface comprises a first set of links; and
each link of the first set of links is associated with an issue identified from the first other issue data.

12. The method of claim 11, wherein, in response to receiving a user selection of a link of the first set of links, causing display of an overlay card that includes additional data related to a respective issue associated with a selected link.

13. The method of claim 11, wherein:
the third graphical user interface comprises a second set of links; and
each link of the second set of links is associated with an issue identified from the second other issue data.

14. The method of claim 13, wherein, in response to receiving a user selection of a link of the second set of links, causing display of an overlay card that includes additional data related to a respective issue associated with a selected link.

15. The method of claim 10, wherein:
the first other issue data comprises data from the issue tracking system for issues that have received interactions from both the first user account and the particular user account; and
the second other issue data comprises data from the issue tracking system for issues that have received interactions from both the first user account and the next user account.

16. The method of claim 10, wherein:
the second graphical user interface comprises a navigation control region for advancing to a next graphical interface associated with the next avatar icon of the set of avatar icons; and
the input associated with the navigation to the next avatar icon comprises an input to the navigation control region.

17. A server system comprising:
a memory allocation defined by:
a data store of one or more executable assets; and
a working memory allocation;
a processor allocation configured to load the one or more executable assets from the data store into the working memory allocation to instantiate an instance of a client application on a mobile device and configured to:
authenticate a first user account of the mobile device;
cause display of a first graphical user interface within the client application in a display of the mobile device;
generate and submit a first request of an organizational mapping system, the first request requesting other user accounts having a hierarchical relationship with the first user account;
receive in response to the first request, from the organizational mapping system, a first set of other user accounts different from the first user account;
generate and submit a second request to an issue tracking system, the request including an identifier corresponding to the first user account;
receive from the issue tracking system in response to the second request:
an indication of one or more issues associated with the first user account, each issue of the one or more issues identified based on a respective status satisfying a status criteria;
a second set of other user accounts different from the first user account, each identified using issue data associated with the one or more issues; and
mutual issue data for the one or more issues that are associated with the first user account and at least one of the second set of other user accounts;
cause display of a first graphical region in the first graphical user interface, the first graphical region comprising a set of avatar icons, each avatar icon of the set of avatar icons corresponding to a respective user account of at least one of the first set or the second set of other user accounts; and
cause display of a second graphical region in the first graphical user interface, the second graphical region comprising the mutual issue data received from the issue tracking system;
in response to a selection of an avatar icon of the set of avatar icons:
send, to the issue tracking system, a third request for other issue data that is associated with a particular user account corresponding to the selected avatar icon; and
cause display of a second graphical user interface comprising a first overlay card on the display of the mobile device, the first overlay card replacing the first graphical user interface on the display of the mobile device and comprising a third graphical region including the selected avatar icon, and a fourth graphical region including the other issue data.

18. The server system of claim 17, wherein the processor allocation is configured to:
determine an order of the first set and the second set of other user accounts; and
display the set of avatar icons in accordance with the determined order.

19. The server system of claim 18, wherein the order is based on a required input to the issue data from the first user account.

20. The server system of claim 17, wherein the processor allocation is further configured to:
determine whether an input from the first user account is required for one or more of the respective issues; and
in response to determining that the input is required from the first user account, cause display of a notification icon over a respective avatar icon of the set of avatar icons.

* * * * *